United States Patent
Pant (10) Patent No.: US 8,587,231 B2
(45) Date of Patent: Nov. 19, 2013

(54) METHOD AND SYSTEM FOR ELECTRONIC BRAKING OF A MOTOR

(75) Inventor: Pradeep M. Pant, Cockeysville, MD (US)

(73) Assignee: Black & Decker Inc., Newark, DE (US)

( * ) Notice: Subject to any disclaimer, the term of this patent is extended or adjusted under 35 U.S.C. 154(b) by 223 days.

(21) Appl. No.: 13/247,250

(22) Filed: Sep. 28, 2011

(65) Prior Publication Data

US 2012/0074881 A1    Mar. 29, 2012

Related U.S. Application Data (60) Provisional application No. 61/387,113, filed on Sep. 28, 2010.

(51) Int. Cl.
*H02P 3/00* (2006.01)

(52) U.S. Cl.
USPC ...... 318/400.09; 318/362; 318/365; 318/364; 318/374; 318/703; 318/400.1; 318/400.13; 318/400.18; 318/400.28; 318/400.3; 173/2; 173/170; 173/7

(58) Field of Classification Search
USPC ............ 318/400.09, 362, 365, 364, 374, 703, 318/400.1, 400.13, 400.18, 400.26, 400.3
See application file for complete search history.

(56) References Cited

U.S. PATENT DOCUMENTS

| | | | |
|---|---|---|---|
| 4,663,575 A | 5/1987 | Juzswik et al. | |
| 4,705,997 A | 11/1987 | Juzswik | |
| 6,274,993 B1 | 8/2001 | Itabashi et al. | |
| 6,291,955 B1 | 9/2001 | Itabashi et al. | |
| 6,329,777 B1 | 12/2001 | Itabashi et al. | |
| 6,607,041 B2 * | 8/2003 | Suzuki et al. | 173/4 |
| 6,917,169 B2 * | 7/2005 | Nagasawa et al. | 318/280 |
| 7,084,594 B2 | 8/2006 | Itabashi et al. | |
| 7,414,425 B2 | 8/2008 | O'Gorman et al. | |
| 7,439,714 B2 | 10/2008 | Llorente Gonzalez et al. | |
| 7,545,052 B2 | 6/2009 | Llorente Gonzalez et al. | |
| 7,705,548 B2 * | 4/2010 | Galbiati | 318/5 |
| 2007/0296462 A1 | 12/2007 | Hwang et al. | |
| 2009/0241744 A1 * | 10/2009 | Matsunaga | 81/469 |
| 2009/0265992 A1 | 10/2009 | Hass et al. | |

(Continued)

FOREIGN PATENT DOCUMENTS

| | | |
|---|---|---|
| DE | 3614093 A1 | 11/1987 |
| EP | 1596491 A2 | 11/2005 |
| JP | 2008271612 A | 11/2008 |

OTHER PUBLICATIONS

"AVR443: Sensor-based Control of Three Phase Brushless DC Motor," Rev. 2596B-AVR-02/06. 2006 Atmel Corporation.

*Primary Examiner* — Rita Leykin
(74) *Attorney, Agent, or Firm* — Amir Rohani; Adan Ayala (57) ABSTRACT

A power tool includes a housing, a brushless DC motor housed inside the housing, a power supply, a control unit, and an input unit such as a trigger switch actuated by a user. The control unit controls the commutation of the motor through a series of power switches coupled to the power supply. The control unit initiates electronic braking of the motor after occurrence of a condition in the input unit, such as trigger release or reduced speed, indicative of the power tool shutdown. A mechanism is provided to power the control unit for a predetermined amount of time after the detection of the condition from the input unit in order to complete the electronic braking of the motor.

20 Claims, 6 Drawing Sheets

(56) References Cited

U.S. PATENT DOCUMENTS

| | | | |
|---|---|---|---|
| 2009/0308628 A1* | 12/2009 | Totsu | 173/176 |
| 2009/0315491 A1* | 12/2009 | Karwath et al. | 318/379 |
| 2010/0061181 A1* | 3/2010 | Malackowski et al. | 366/142 |
| 2010/0123419 A1 | 5/2010 | Bonvin | |
| 2011/0000688 A1* | 1/2011 | Iwata | 173/1 |

\* cited by examiner

METHOD AND SYSTEM FOR ELECTRONIC BRAKING OF A MOTOR

CROSS-REFERENCE TO RELATED APPLICATIONS

This application claims the benefit of prior filed co-pending U.S. Provisional Application No. 61/387,113, filed Sep. 28, 2010, which is incorporated herein by reference in its entirety.

FIELD OF THE INVENTION

This disclosure relates to a power tool, and more particularly to an electric brushless DC motor for a power tool and the control therefore.

BACKGROUND

The use of cordless power tools has increased dramatically in recent years. Cordless power tools provide the ease of a power assisted tool with the convenience of cordless operation. Conventionally, cordless tools have been driven by Permanent Magnet (PM) brushed motors that receive DC power from a battery assembly or converted AC power. The motor associated with a cordless tool has a direct impact on many of the operating characteristics of the tool, such as output torque, time duration of operation between charges and durability of the tool. The torque output relates to the capability of the power tool to operate under greater loads without stalling. The time duration of the power tool operation is strongly affected by the energy efficiency of the motor. Since, during some operating modes cordless tools are powered by battery modules that contain a limited amount of energy, the greater the energy efficiency of the motor, the longer the time duration that the tool can be operated. The durability of a power tool is affected by many factors, including the type of motor that is used to convert electrical power into mechanical power.

Brushed motors such as the PM brushed motors that are generally employed in power tool applications are susceptible to damaged brushes over time. The main mechanical characteristic that separates Permanent Magnet brushless motors from Permanent Magnet brushed motors is the method of commutation. In a PM brushed motor, commutation is achieved mechanically via a commutator and a brush system. Whereas, in a brushless DC motor, commutation is achieved electronically by controlling the flow of current to the stator windings. A brushless DC motor includes a rotor for providing rotational energy and a stator for supplying a magnetic field that drives the rotor. Comprising the rotor is a shaft supported by a bearing set on each end and encircled by a permanent magnet (PM) that generates a magnetic field. The stator core mounts around the rotor maintaining an air-gap at all points except for the bearing set interface. Included in the air-gap are sets of stator windings that are typically connected in either a three-phase wye or Delta configuration. Each of the windings is oriented such that it lies parallel to the rotor shaft. Power devices such as MOSFETs are connected in series with each winding to enable power to be selectively applied. When power is applied to a winding, the resulting current in the winding generates a magnetic field that couples to the rotor. The magnetic field associated with the PM in the rotor assembly attempts to align itself with the stator generated magnetic field resulting in rotational movement of the rotor. A control circuit sequentially activates the individual stator coils so that the PM attached to the rotor continuously chases the advancing magnetic field generated by the stator windings. A set of sense magnets coupled to the PMs in the rotor assembly are sensed by a sensor, such as a Hall Effect sensor, to identify the current position of the rotor assembly. Proper timing of the commutation sequence is maintained by monitoring sensors mounted on the rotor shaft or detecting magnetic field peaks or nulls associated with the PM.

A brushless motor provides many advantages over conventional brushed motors. Conventional brushed motors are substantially less durable than brushless motors because of the wear and tear associated with the brushes. Also, since commutation is handled via a microcontroller, mechanical failures associated with the commutation are minimized and fail conditions are better managed and handled. Furthermore, brushed motors are less efficient than brushless motors due to the friction and the heat associated with the brushes and the commutator. However, using a controller to control tool operations that were conventionally handled mechanically presents its own challenges. For example, while power tools motors were conventionally braked mechanically as the tool was powered off or trigger was released by the user, electronically braking brushless motors via the controller may be problematic, especially because powering off the tool powers off the controller automatically. Further, synchronizing the rotation of the rotor with the sequential commutation managed by the controller may sometimes be challenging.

SUMMARY

In order to solve these and other problems, according to an embodiment of the invention, a power tool is provided. The power tool may be, for example, a drill or an impact driver, although other types of power tools may also be used. The power tool includes a housing and a brushless DC motor housed inside the housing. The motor includes a stator assembly and a rotor assembly at least a portion of which is arranged pivotably inside the stator assembly. A brushless motor referred to in this application may include a brushless DC or AC permanent magnet motor, a flux switching motor, a switched reluctance motor, or any other brushless motor.

The power tool further includes an input unit actuated by a user. The input unit may be, for example, a trigger switch, although other input means such as a touch-sensing switch, a capacitive-sensing switch, a dial, etc. may also be utilized. The input unit may incorporate various functionalities such as variable-speed, ON/OFF, forward/reverse, into a single module. According to an embodiment, the ON/OFF function is incorporated into the variable-speed actuator (e.g., the variable speed trigger switch), such that the user's release of the actuator turns OFF the tool. The variable-speed actuator may be coupled to a potentiometer or other speed sensing components.

According to an aspect of the invention, the power tool further includes a control unit configured to control commutation of the motor through a plurality of power switches. The power switches include high-side power switches (e.g., FETs) and low-side power switches coupled in series between the power sources and ground. The gates of the power switches are coupled to the control unit. The power switches are coupled to the coils of the motor. The control unit uses the power switches to electronically brake the motor when the tool is powered OFF or if it detects that power OFF is imminent. In an embodiment, the control initiates electronic braking of the motor after occurrence of a condition in the input unit indicative of the power tool shut-down. This condition may correspond to the ON/OFF switch being turned OFF or the speed of potentiometer falling below a speed threshold. In order to ensure that the control unit is not powered off before the braking is complete, a mechanism is provided to keep the control unit powered for a predetermined amount of time after the detection of the condition from the input unit in order to complete the electronic braking of the motor.

According to an embodiment, the control unit is kept powered using a delay module arranged between a power contact of the control unit and the ON/OFF switch of the input unit. The delay module may be one or more capacitors or other energy storage module that delays turning OFF the power contact for a predetermined time. Alternatively, the control unit itself may monitor the state of the ON/OFF (or the speed of the potentiometer) and provide a feedback signal to the power contact to keep it ON for a predetermined time.

According to an embodiment, electronic braking is performed by alternatively switching between the high-side switches and the low-side switches to short the motor windings.

According to another aspect of the invention, a method for controlling a motor inside a power tool is provided. The method includes: controlling commutation of the motor via a controller and through power switches coupled to a power supply; initiating electronic braking of the motor via the controller after occurrence of a condition in a user-actuated input unit of the power tool indicative of the power tool shut-down; and keeping the controller ON for a predetermined amount of time after the detection of the condition from the input unit in order to complete the electronic braking of the motor.

For a more complete understanding of the invention, its objects and advantages, reference may be had to the following specification and to the accompanying drawings.

BRIEF DESCRIPTION OF THE DRAWINGS

The drawings described herein are for illustration purposes only and are not intended to limit the scope of this disclosure in any way.

DESCRIPTION

Figure 1:
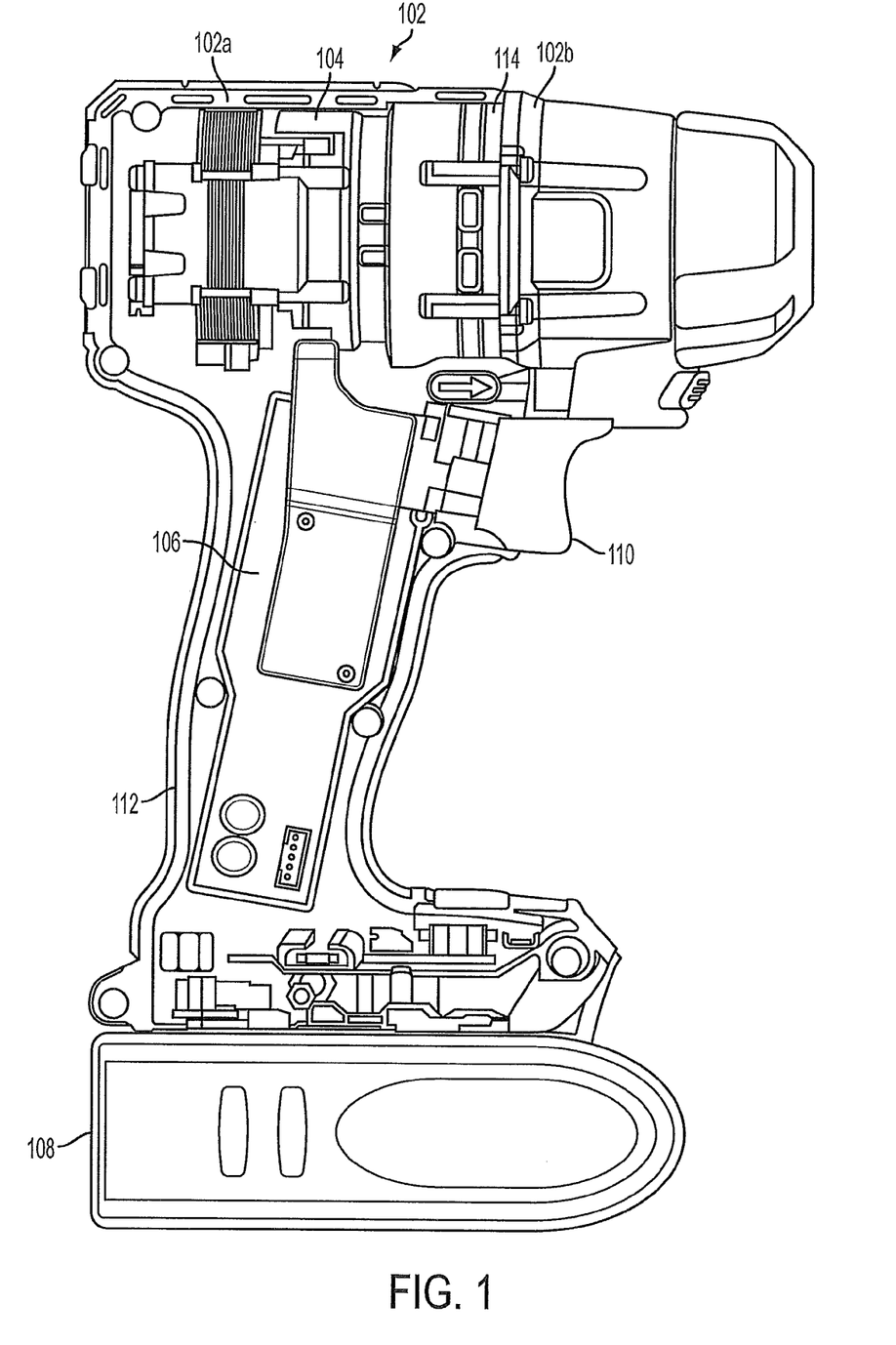
FIG. 1 depicts a perspective cross-sectional view of a power tool, according to an embodiment of this disclosure.

With reference to the FIG. 1, a power tool 100 constructed in accordance with the teachings of the present disclosure is illustrated in a longitudinal cross-section view. The power tool 100 in the particular example provided may be a drill/driver, but it will be appreciated that the teachings of this disclosure is merely exemplary and the power tool of this invention could be a circular saw, a reciprocating saw, or any similar portable power tool constructed in accordance with the teachings of this disclosure. Moreover, the output of the power tool driven (at least partly) by a transmission constructed in accordance with the teachings of this disclosure need not be in a rotary direction.

The power tool shown in FIG. 1 may include a housing assembly 102, a motor assembly 104, a control module 104, a battery pack 108, an input unit (e.g., a variable speed trigger) 110, a transmission assembly 114, an output spindle (not shown), and a chuck (not shown) that can be coupled for rotation with the output spindle. The housing assembly 102 can include a housing 102a and a gear case 102b that can be removably coupled to the housing 102a. The housing 102a can define a housing body and a handle 112.

According to an embodiment, the motor 104 is received in the housing 102a. The motor can be any type of motor and may be powered by an appropriate power source (electricity, pneumatic power, hydraulic power). In the particular example provided, the motor is a brushless DC electric motor and is powered by a battery pack 108. An input unit 110 is mounted in the handle 112 below the housing 102a. The input unit 110 may be a variable speed trigger switch, although other input means such as a touch-sensor, a capacitive-sensor, a speed dial, etc. may also be utilized. In an embodiment, variable speed trigger switch may integrate the ON/OFF, Forward/Reverse, and variable-speed functionalities into a single unit and provide respective inputs of these functions to the control unit 106. The control unit 106, which is coupled to the input unit 110 as described further below, supplies the drive signals to the motor. In the exemplary embodiment of the invention, the control unit 106 is provided in the handle 112.

The brushless motor 104 depicted in FIG. 1 is commutated electronically by the control unit 106. The tool 100 is powered by a suitable power source such as the battery pack 108. It is envisioned, however, that the present disclosures can be applied to a power tool with an AC power source, which may further include an AC-to-DC converter to power to motor. Using the variable-speed input and other inputs from the input unit 110, the control unit 106 controls the amount of power supplied to the motor 104. In an exemplary embodiment, the control unit 106 controls the Pulse Width Modulation (PWM) duty cycle of the DC power supplied to the motor 104.

The control unit 106 and the input unit 110 are discussed herein, according to an embodiment of the invention.

Referring back to FIG. 1, the control unit 106 is placed inside the handle 102 of the tool, according to an exemplary embodiment. This location provides numerous advantages over conventional locations for the control module near the battery pack 108 or near the motor 104. Placement of the control unit 106 inside the handle 102 minimizes the interconnections between the variable speed trigger 902/906 and the FWD/REV lever 904 of the input unit 11 and the control unit 106. This placement also reduces the length of wire connections required between the battery pack 108, the control unit 106, and the motor 104. This results in lower cost, less complex assembly, and increased reliability of the system. The location of the control unit 106 also reduces the overall length of the tool as compared to configuration where location of control unit is behind or in the vicinity of the motor 104.

Figure 2A:
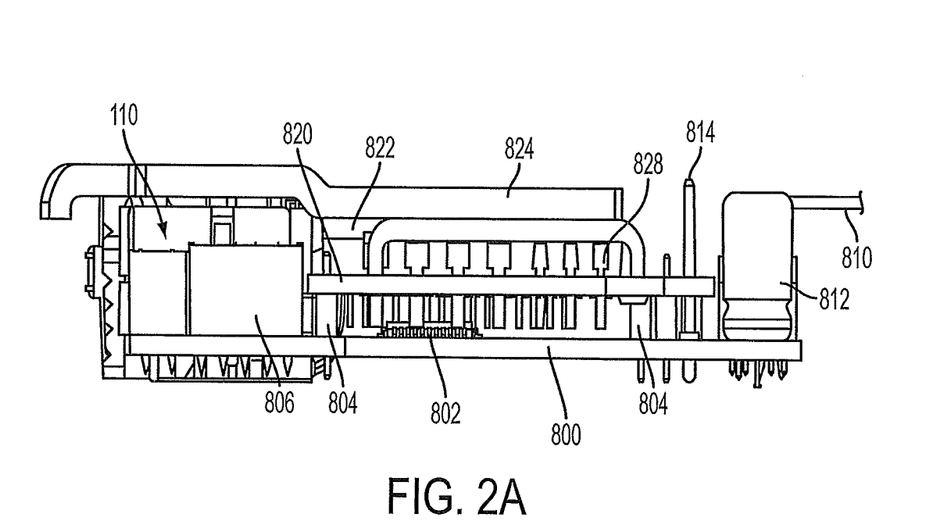
FIGS. 2A and 2B depict cross-sectional and perspective views of a control unit and an integrated input unit, according to an embodiment of the invention.
Figure 2B:
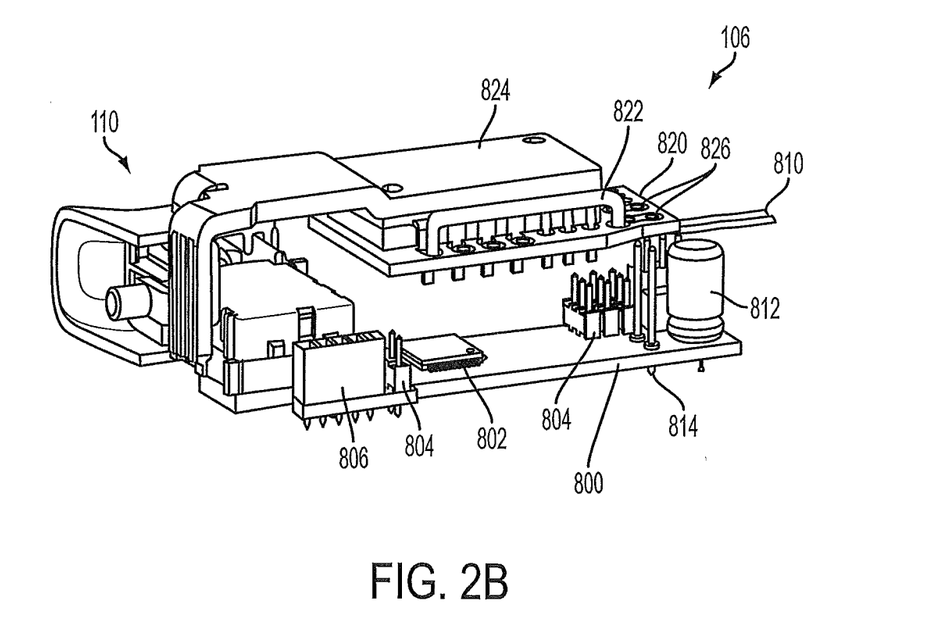

Referring now to the cross-sectional view of FIG. 2A and the expanded perspective view of FIG. 2B, the control unit 106 inside the handle 112 of the power tool is depicted. As shown in these figures, the control unit 106 includes a control circuit board 800 arranged in parallel to a power circuit board 820. In an embodiment, the power circuit board 820 is mounted on the control circuit board 800. The two boards are interconnected via the support pins 828, 814, 804, which also provide various control signal and power connections between the two boards. This arrangement minimizes the length of the control unit 106.

The control circuit board 800 includes a micro-controller 802. In an exemplary embodiment, the micro-controller 802 may be a programmable microprocessor, controller, or digital signal processor. The control pins 804 are coupled to the micro-controller 802 and the power circuit board 820. The control circuit board 800 also includes a Hall bus interface 806, which is couples the micro-controller 802 to the Hall Effect sensor interface 222 of the Hall board mount 212. The control circuit board 800 is coupled to the battery pack 108 via power inputs 810. Power pins 814 provide power, as managed by the controller 802, to the power circuit board 820. Also provided on the control circuit board 800 is a bulk capacitor 812 coupled to the power inputs 810 to minimize the effect of the parasitic inductance of the battery pack 801 power connections.

The bulk capacitor 812 is typically used in power tool control units for reducing the variation in voltage supplied to the power module from battery. The power circuit board 820 is smaller in length than the control board 800 in order to allow the bulk capacitor 812 and the input unit 100 to be mounted on the control circuit board 800 adjacent the power circuit board 820. The capacitor 812 is connected to the power circuit board 820 via dedicated power pins 814.

The power circuit board 820 primarily includes a smart power module ("SPM", also referred to as intelligent power module) 822, according to an embodiment. SPM 822 is an integrated circuit including six power MOSFETs that power the stator windings of the motor 104, as well as the gate drivers, bootstrap circuit, and all other components needed to drive the MOSFETs. The internal circuitry of the SPM 822 is beyond the scope of this disclosure and is not discussed in detail, but would be known to a person of ordinary skill in the art. Alternatively, it is possible to place and rout the power MOSFETs, gate drivers, and other circuitry directly on the power circuit board 820, according to an alternative embodiment. The power circuit board 820 further includes pins 828, which provide further control signal connections to the control circuit board 800, and pin receptacles 828 for connecting to the control pins 804 and power pins 814.

In a three-phase BLDC motor, which is very common particularly for power tool applications, the micro-controller controls the flow of current to the stator windings via a series of Field Effect Transistors (FETs). In the configuration shown in FIG. 3, which depicts a circuit diagram for coupling the controller 302 to the motor 104, three high-side FETs 312, 314, 316 are provided to selectively connect the supply of VCC power from the battery pack 108 to the motor 304. Also, three low-side FETs 322, 324, 326 are provided to selectively connect the motor 104 to the ground when the battery pack 108 power is cut off via a corresponding high-side FET. Since the controller 302 provides logic ON/OFF signal outputs, a high-side gate driver 310 and a low-side gate driver 320 is additionally provided. The gate drivers 310 and 320 translate the logic ON/OFF signals from the controller 302 into power signals necessary to controls the FETs. Specifically, the high-side gate driver 310 receives inputs IN(WH), IN(VH), and IN(UH) corresponding to the three motor windings W, V and U from the controller 302 and outputs OUT(WH), OUT(VH), and OUT(UH) to the gates of the high-side FETs 312, 314, 316, respectively. Similarly, the low-side gate driver 320 receives inputs IN(WL), IN(VL), and IN(UL) corresponding to the three motor windings W, V and U from the controller 302 and outputs OUT(WL), OUT(VL), and OUT(UL) to the gates of the low-side FETs 322, 324, 326, respectively. The source of each high-side FETs 312, 314, 316 is coupled to the drain of a corresponding low-side FET 322, 324, 326 as well as the windings W, V, U of the three-phase brushless motor 104. The controller 54 is configured such that any time one of the signals OUT(WH), OUT(VH), OUT(UH) is driven high, the corresponding signal OUT(WL), OUT(VL), OUT(UL) is driven low, and vice versa. In one embodiment, the gate drivers and the FETs may be integrally combined into a single module.

The FETs described above are typically N-type Metal Oxide Semiconductor Field Effect Transistors (MOSFETs). N-type MOSFETs are utilized for both high-side and low-side FETs because they take up substantially less space and are less expensive than comparable P-type MOSFETs. However, using n-type MOSFETs in place of p-type MOSFETs requires application of a voltage substantially higher than the battery pack 108 power supply (V+) at the gate in order to saturate the transistors and switch the transistors from a conducting state to a non-conducting state and vice versa. In order to meet the high-voltage requirement of the high-side FETS, a bootstrap circuit may be used, details of which are outside the scope of this disclosure.

Figure 3:
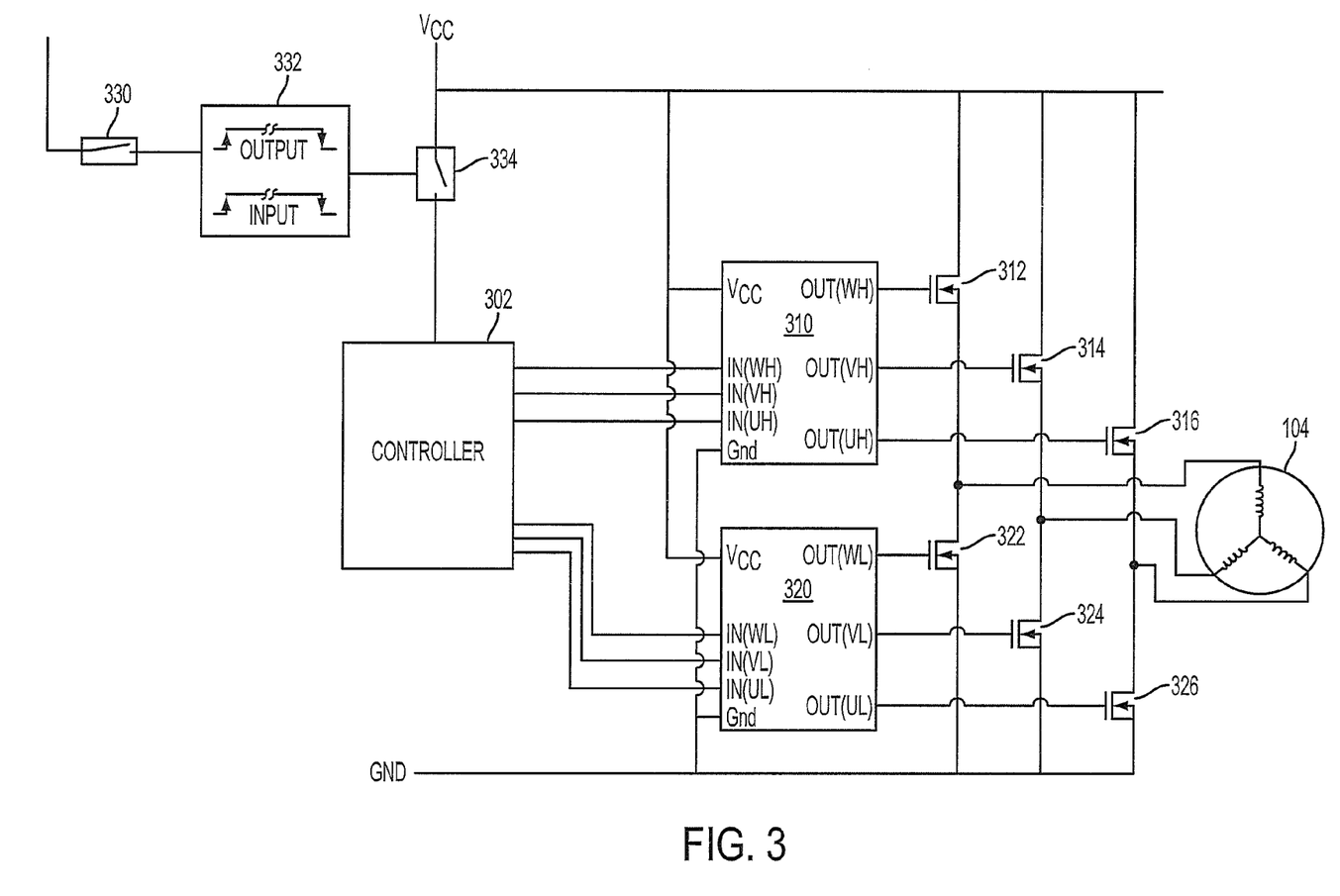
FIG. 3 depicts a circuit diagram of the control module and the motor, according to an embodiment.

According to one aspect of the invention, a system and method for electronic braking of the motor 104 is provided. Electronic braking of a permanent magnet motor is typically performed by short-circuiting the motor terminals. In a three phase brushless motor, as shown in FIG. 3, all of the three terminals of the windings U, V, W are short-circuited together by connecting all the three terminals to either Vcc or Ground in order to brake the motor 104. The terminals remain shorted by turning on either the high-side FETs or the low-side FETs until the motor comes to a complete halt. During this time, the motor current continues to circulate through the windings U, V, W until the motors comes to a full stop.

In power tools utilizing electronic braking, recent trends have been to use a logic power on/off switch rather than a power switch. In such power tools, the release of the trigger cuts off power to the motor as well as the motor controller. Once power to the controller is cut off, however, the controller is no longer able to execute the braking algorithm to bring the motor to a halt. In order to solve this problem, according to an embodiment of the invention, a delay mechanism is utilized to keep the controller powered up for a certain amount of time after the user releases the trigger. This delay can be provided in a variety of ways and may be implemented in hardware or software. In one embodiment, as depicted in FIG. 3, a delay module 332 may be provided between the logic switch 330 and the power contact 334. The delay module 332 introduces a known delay between trigger release (i.e., logic switch 33) and the cutoff of Vcc power through the power contact 334 to the controller 302. The delay module 332 may be, for example, a physical module including one or more energy storage components (e.g, capacitors) utilized to keep the power contact 334 ON for a predetermined amount of time. The delay in this case may be, for example, 100 msecs. The storage components in this case would provide sufficient power to keep the controller 302 running until braking algorithm is complete.

Alternatively, instead of using a delay module 332, the delay mechanism may be implemented in software and executed via the controller 302. Specifically, the controller 302 may be utilized to monitor the state of the switch 330 as well as the user-selected speed of the motor through a potentiometer (not shown). Once the user-selected speed falls below a certain threshold (or reaches zero), the controller 302 assumes that tool shutdown is imminent and initializes braking. Alternatively, the controller 302 may monitor trigger release and initiate braking once the trigger is released to a predetermined position. The controller 302 is also coupled to the power contact 334 such that, when it determines that motor speed has reached its threshold or that the trigger release has reached its predetermined position, it turns OFF the power contact 334 after a predetermined amount of time, e.g., 100 msecs. This provides the controller 302 with sufficient time to execute the braking algorithm before the controller 302 is powered down.

A further aspect of the electronic braking system is discussed herein. Conventionally, electronic braking for BLDC motors has been carried out by turning on either the top or the bottom MOSFETS to carry the braking current. Breaking in this approach has been performed by, for example, continuously turning on all three low-side MOSFETs at once while all three high side MOSFETs remain turned OFF throughout the whole braking cycle, or vice versa. As the braking current relies on the inertia, higher current is expected if a bigger accessory is attached to the tool.

According to an embodiment of the invention, an improved braking algorithm is provided wherein the braking current is shared between the high FETs 312, 314, 316 and the corresponding low side FETs 322, 324, 326 in order to utilize all the available MOSFETs for sinking the current. In this embodiment, the high and low side MOSFETs alternately turn ON and OFF, thus sharing the load of current required for the electronic braking. Any given MOSFET in this embodiment is turned on only for a predetermined percentage of the total time required for braking, for example, 50% of the time, thus reducing the average current load for each MOSFET by 50%. This arrangement reduces the amount of localized heat generated inside the power module.

Another aspect of the invention is described herein. In brushless DC motors, when the motor is running at very low and/or inconsistent speed, or when the motor is bouncing, the motor controller may run into an incorrect commutation sequence, causing the motor to rotate in reverse direction. Specifically, in sensor-based brushless DC motors, the motor controller calculates the commutation of the motor based on the state of the current hall signal and the previous state of the hall signal. The controller uses this information to fire the relevant inverter phases. When the motor is running at very low and/or inconsistent speed, or when the motor is experiencing high vibration, the motor controller may inadvertently reverse direction. This may happen because the motor is turning too slowly to keep up with the commutation sequence, and thus a subsequent commutation of the stator coils causes the rotor direction to reverse occasionally. Similarly, when the rotation of the rotor may be stalled or affected at low speed by high amount of vibration, it places the rotor out of sync with the commutation sequence, causing the rotor to direction to reverse occasionally. It has been seen that inadvertent motor reversal occurs particularly when an angle advancing algorithm (described below in detail) is executed at low speed.

Figure 4:
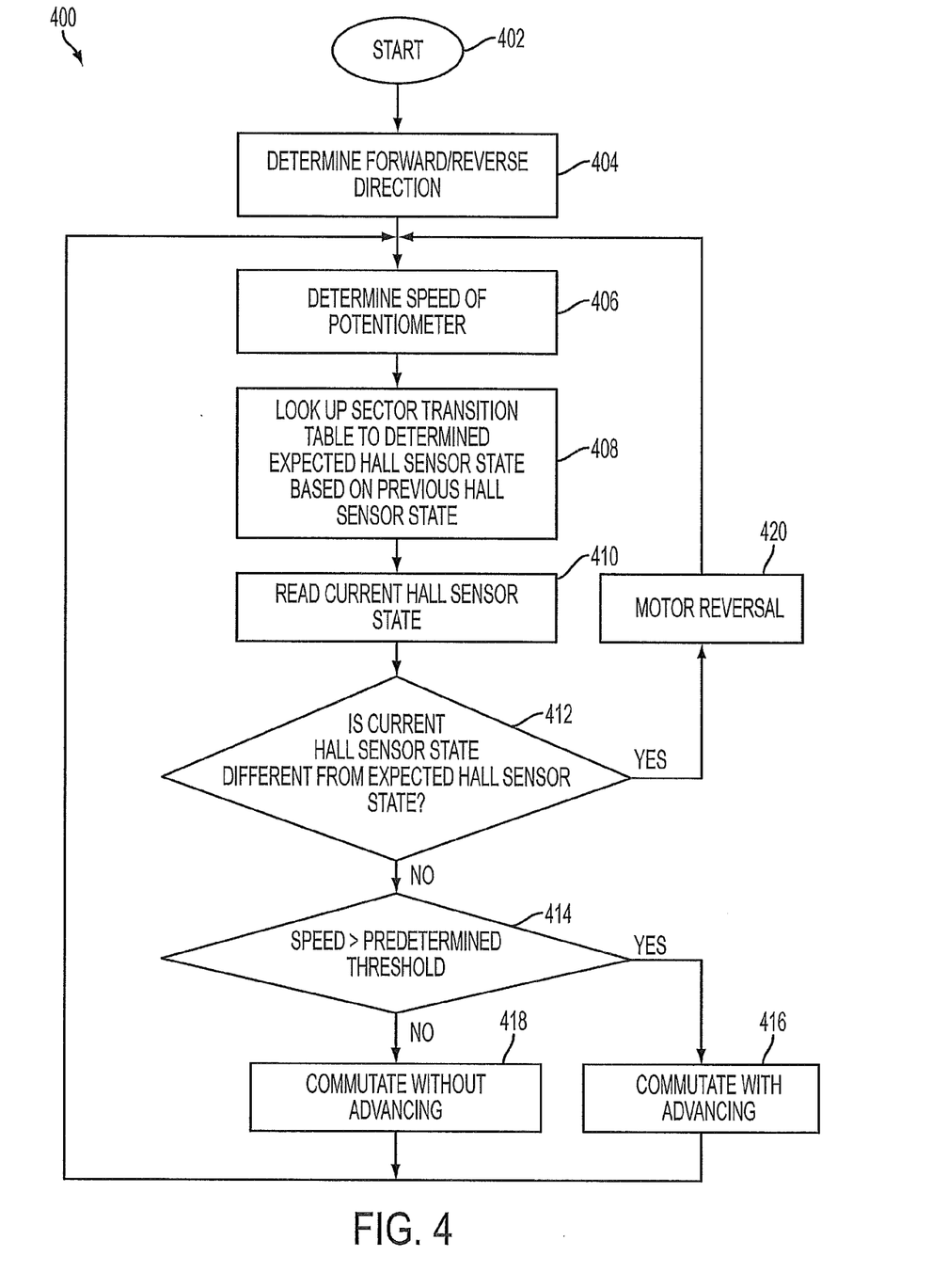
FIG. 4 depicts an exemplary process for avoidance of motor reversal, according to an exemplary embodiment.

To avoid this condition from occurring, according to an embodiment of the invention shown in FIG. 4, an exemplary method 400 for detection and correction of inadvertent motor reversal is provided. In this exemplary method 400, which starts at step 402, the position of the forward/reverse switch (or other forward/reverse input) is determined at step 404. Thereafter, the current speed of the potentiometer (or other user-activated speed indicator) is determined at step 406. In step 408, the controller 302 uses a look-up commutation sector table to determine the next expected Hall sensor state (or the next proper commutation sequence) based on the previous Hall sensor state (or based on the previous commutation). The look-up table is a pre-designed table having corresponding entries for Hall sensor state and the following commutation. Next, in step 410, the controller 302 reads the current Hall sensor state information from the Hall Effect sensors (or other type of sensor capable of sensing the position of the rotor) of the motor. The operation of Hall Effect sensors is known in the art and is discussed in PCT Application No. PCT/US11/40346 (claiming the benefit of U.S. Provisional Application No. 61/354,537, filed Jun. 14, 2010), contents of both of which are incorporated herein by reference in their entirety.

After the Hall sensor state is read, it is determined whether the current Hall sensor state matches the expected Hall sensor state in step 412. If so, the controller determines that the motor is operating properly (i.e., in its correct direction) and proceeds to step 414. In this step, the controller determines whether the speed detected in step 406 exceeds a predetermined speed. As mentioned above, it has been found that at low speeds, angle advancing (explained below) increases the likelihood of inadvertent motor reversal. Therefore, if the motor speed exceeds a predetermined threshold (i.e., below which there is a likelihood of inadvertent motor reversal), the motor is commutated with angle advancing at step 416. Otherwise, the motor commutates without angle advancing at step 418. After commutation, the process returns to step 406.

If, however, the controller determines that the current Hall sensor State does not match the expected Hall sensor state in step 412, such condition is an indication of inadvertent motor reversal (step 420). Specifically, if the detected Hall sensor state is different from what is expected based on the sequence look-up table, it is clear that the motor is not turning in its proper direction. Thus, a BLDC motor, commutating the motor using the predetermined sequence would further drive the motor in the incorrect direction. In this case, commutation of the motor is skipped altogether and the process is returned to step 406 until the motor returns to its property direction of rotation.

Figure 5:
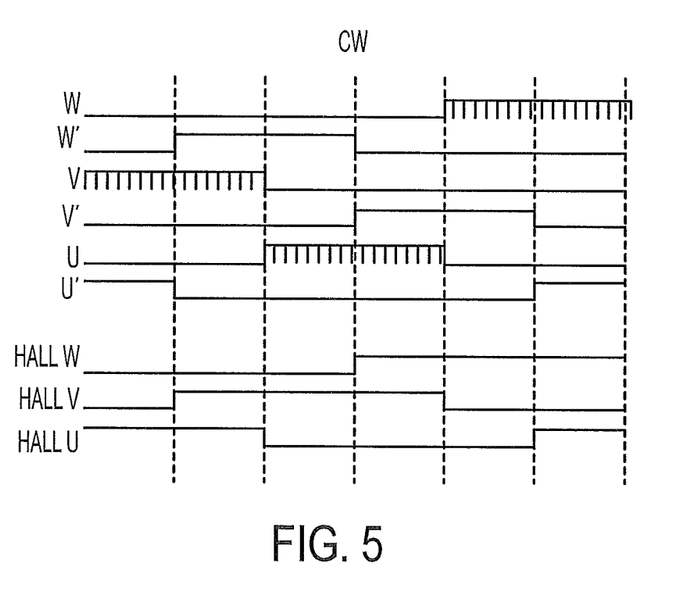
FIG. 5 depicts an exemplary graph of motor commutation without angle advancing.
Figure 6:
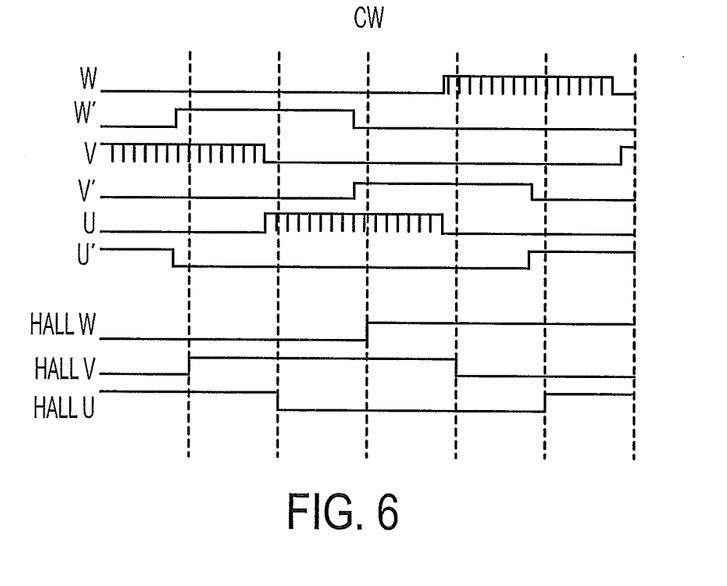
FIG. 6 depicts an exemplary graph of motor commutation with angle advancing.

Angle advancing is herein described according to an embodiment of the invention. Where the controller is not provided with an angle advancing, commutation happens right after the hall transition, as depicted in FIG. 5. However, where an angle advancing is implemented, commutation has to happen before a hall transition, as shown in FIG. 6. This may be performed by creating a time delay equivalent to the difference between hall period and advance angle and the commutation is performed after delay expires.

Figure 7:
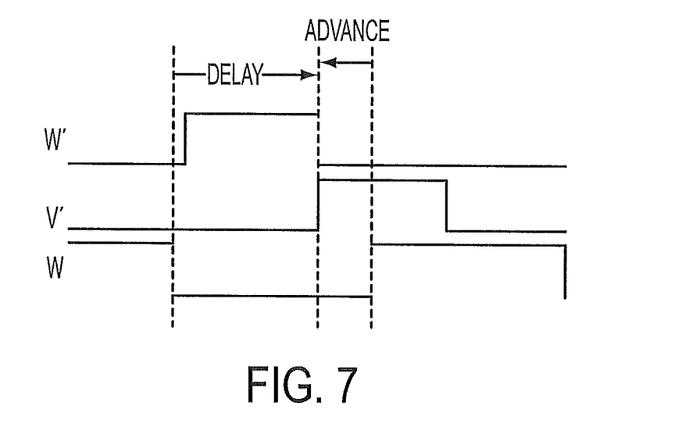
FIG. 7 depicts a graph of zero degree advancing according to an exemplary embodiment.

FIG. 7 depicts an example of how angle advancing may be implemented. A delay routine starts at the hall W transition from high to low. The delay is calculated by calculating Advance Angle in terms of time and subtracting it from the Time Period of hall signal. This method relies on the assumption that hall transitions are happening consistently and predicted transitions are holding true.

The description of the invention is merely exemplary in nature and, thus, variations that do not depart from the gist of the invention are intended to be within the scope of the invention. Such variations are not to be regarded as a departure from the scope of the invention.

The invention claimed is:

1. A power tool comprising:
a housing;
a brushless motor housed inside the housing;
a power supply;
an input unit actuated by a user; and
a control unit configured to control commutation of the motor through a plurality of power switches coupled to the power supply and to initiate electronic braking of the motor after occurrence of a condition in the input unit indicative of the power tool shut-down, the control unit remaining powered for a predetermined amount of time after the detection of the condition from the input unit in order to complete the electronic braking of the motor.

2. The power tool of claim 1, wherein the input unit comprises ON/OFF switch.

3. The power tool of claim 2, further comprising a power contact arranged between the power supply and the control unit, the power contact being controlled to provide power to the control unit for the predetermined time after the ON/OFF switch turns OFF.

4. The power tool of claim 3, further comprising a delay module coupled to the power contact and configured to keep the power contact ON for the predetermined time after the ON/OFF switch is turned OFF.

5. The power tool of claim 4, wherein the delay module comprises a capacitor.

6. The power tool of claim 2, wherein the input unit further comprises an actuator coupled to a potentiometer and the ON/OFF switch, wherein release of the actuator turns off the ON/OFF switch.

7. The power tool of claim 6, wherein the control unit monitors the potentiometer speed and initiates electronic braking of the motor when the potentiometer speed falls under a predetermined speed threshold.

8. The power tool of claim 7, further comprising further comprising a power contact arranged between the power supply and the control unit.

9. The power tool of claim 8, further comprising a delay module coupled to the power contact and configured to keep the power contact ON for the predetermined time after the potentiometer speed falls under the predetermined speed threshold.

10. The power tool of claim 8, wherein the control unit is configured to control the power contact and to keep the power contact ON for the predetermined time after the potentiometer speed falls under the predetermined speed threshold.

11. The power tool of claim 8, wherein the control unit is configured to control the power contact and to keep the power contact ON for the predetermined time after the ON/OFF switch is turned OFF.

12. The power tool of claim 1, wherein the plurality of power switches comprises a plurality of high-side switches coupled to corresponding plurality of low-side switches.

13. The power tool of claim 12, wherein the control unit is configured to alternatively turn the plurality of low-side switches and plurality of high-side switches ON and OFF to brake the motor.

14. The power tool of claim 1, wherein the control unit comprises a programmable micro-controller or micro-processor, the power source comprises a DC battery, and the plurality of power switches comprises Field Effect Transistors (FETs).

15. A method of controlling a motor inside a power tool comprising:
controlling commutation of the motor via a controller and through a plurality of power switches coupled to a power supply;
initiating electronic braking of the motor via the controller after occurrence of a condition in a user-actuated input unit of the power tool indicative of the power tool shut-down; and
keeping the controller ON for a predetermined amount of time after the detection of the condition from the input unit in order to complete the electronic braking of the motor.

16. The method of claim 15, comprising:
keeping the controller ON for the predetermined amount of time after an ON/OFF switch of the input unit is turned OFF.

17. The method of claim 15, comprising:
monitoring a speed of a potentiometer from the input unit; and
keeping the controller ON for the predetermined amount of time after the speed of the potentiometer falls below a predetermined speed threshold.

18. The method of claim 15, comprising:
generating a delay via a delay module between the input unit and a power contact coupled to the power supply to keep the controller ON for the predetermined amount of time.

19. The method of claim 15, comprising:
providing a feedback signal from the controller to a power contact coupled to the power supply to keep the controller ON for the predetermined amount of time.

20. The method of claim 15, comprising:
turning a plurality of high-side power switches and a plurality of low-side power switches ON and OFF alternatively to brake the motor.

* * * * *